United States Patent [19]

Davinroy

[11] Patent Number: 5,653,592
[45] Date of Patent: Aug. 5, 1997

[54] METHOD AND APPARATUS FOR MICRO MODELING THE SEDIMENT TRANSPORT CHARACTERISTICS OF A RIVER

[75] Inventor: Robert D. Davinroy, Smithton, Ill.

[73] Assignee: The United States of America as represented by the Secretary of the Army, Washington, D.C.

[21] Appl. No.: 555,559

[22] Filed: Nov. 8, 1995

[51] Int. Cl.[6] ............................................. G09B 25/08
[52] U.S. Cl. ........................... 434/126; 434/151; 434/299
[58] Field of Search .................................... 434/126, 150, 434/151, 152, 299, 389

[56] References Cited

U.S. PATENT DOCUMENTS

| | | | |
|---|---|---|---|
| 3,673,705 | 7/1972 | Wright | 434/126 |
| 3,827,290 | 8/1974 | Carlson | 434/126 |
| 3,982,330 | 9/1976 | Saltsman et al. | 434/126 |
| 4,056,892 | 11/1977 | Atencio | 434/151 |
| 5,277,585 | 1/1994 | Aminighazvini | 434/151 |
| 5,427,530 | 6/1995 | Taggart | 434/151 |

FOREIGN PATENT DOCUMENTS

| | | | |
|---|---|---|---|
| 0976475 | 11/1982 | U.S.S.R. | 434/126 |
| 1018146 | 5/1983 | U.S.S.R. | 434/126 |

*Primary Examiner*—Paul J. Hirsch

[57] ABSTRACT

Apparatus for modeling the sediment transport characteristics of a selected section of a river or the like includes an elevated inclined platform adapted to receive an insert representing a scaled model of the section of river to be studied and a water source for delivering water containing a simulated sediment to the model. As the water flows over the model, the sediment is transported so as to simulate the sedimentary characteristics of the modeled portion of the river. The apparatus is provided with a function generator which allows the water to be delivered to the model in accordance with a specified hydrograph and is also provided with a sliding digital micrometer survey system which allows accurate surveys to be taken at selected increments along the model. Method for modeling the sediment transport characteristics of a river is also described.

11 Claims, 3 Drawing Sheets

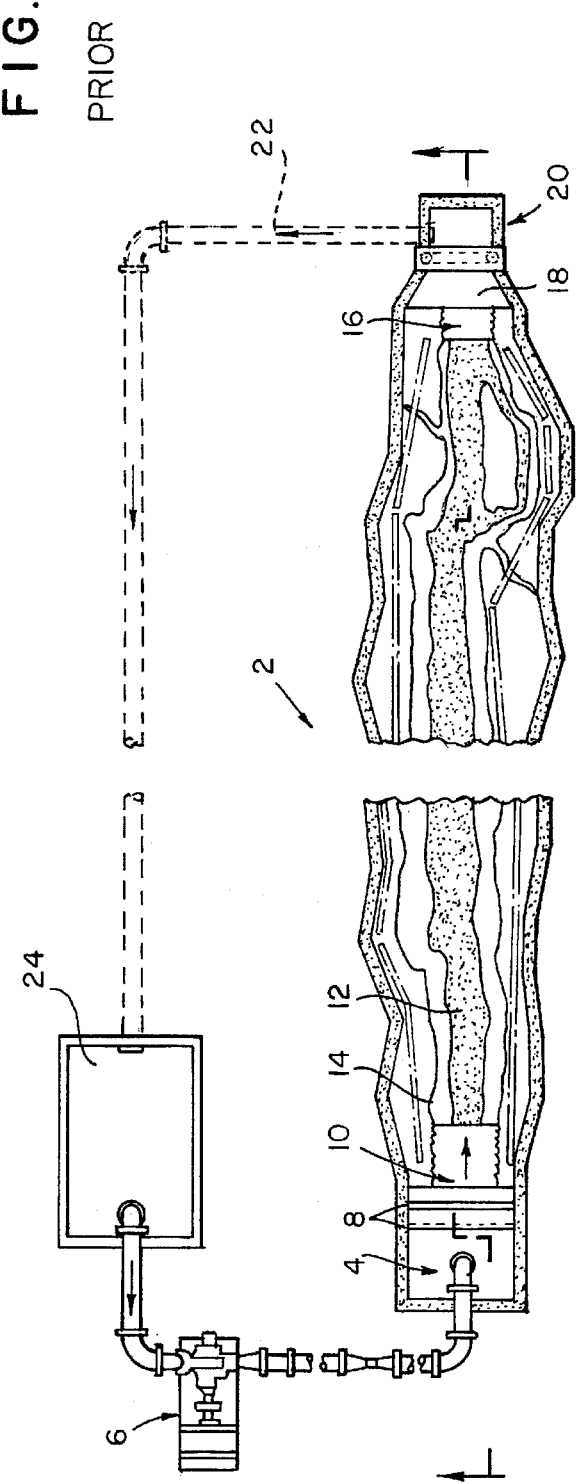
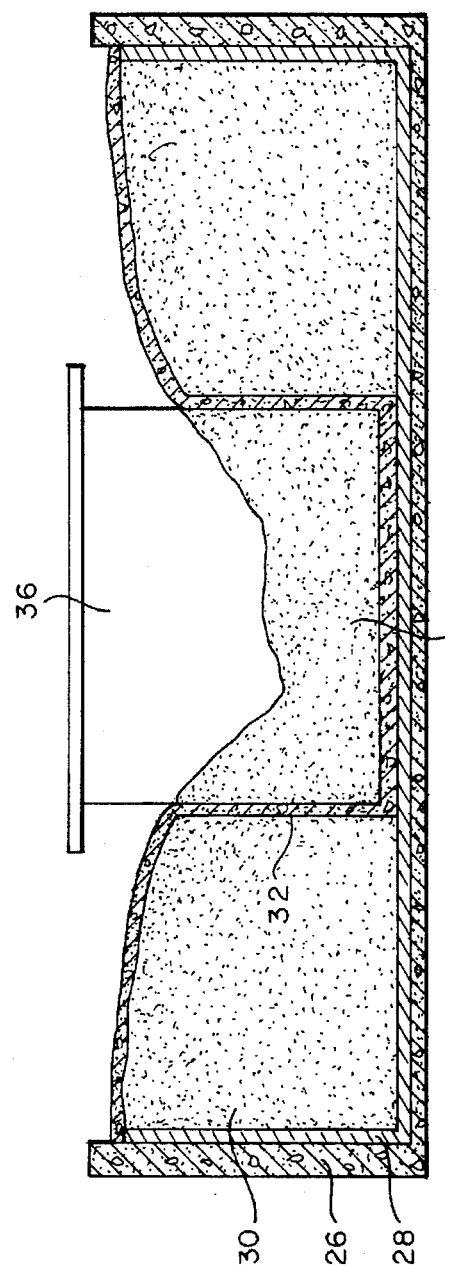

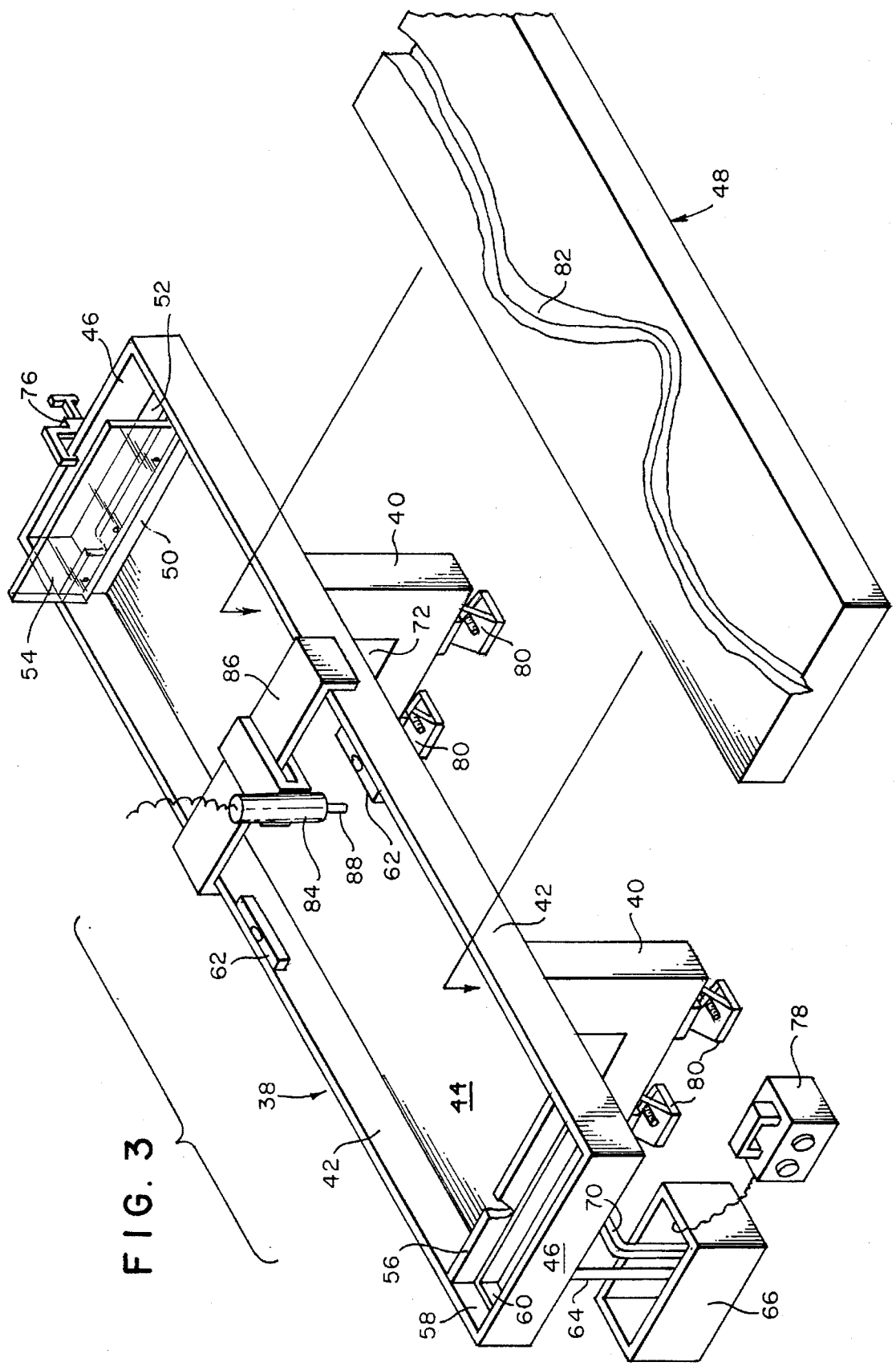

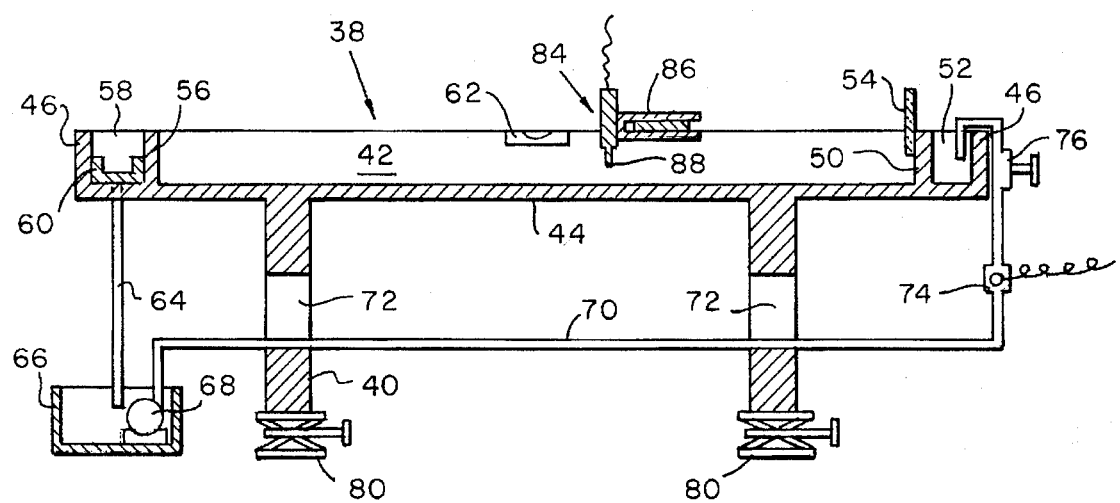
F I G. 4

METHOD AND APPARATUS FOR MICRO MODELING THE SEDIMENT TRANSPORT CHARACTERISTICS OF A RIVER

BACKGROUND OF THE INVENTION

The present invention relates to a scaled model for simulating the sediment transport characteristics of a selected portion of a river, stream, or the like.

Micro modeling is a technological tool which can be used by engineers to investigate the complex processes of sedimentation quickly and economically. It also enables engineers to investigate the effects of navigation and stabilization structures on rivers and streams.

Micro modeling theory is based on the principle that small streams display sediment transport tendencies similar to those of larger rivers. If the particular configuration of a river or stream is accurately constructed to a micro scale, the proper manipulation of certain variables in the micro model, including water flow rate, slope (i.e. floodplain tilt), and sediment, can produce similar sediment transport tendencies as those experienced in the actual prototype. These tendencies may be observed visually and may also be measured through a highly accurate procedure involving electronic digital micrometry.

BRIEF DESCRIPTION OF THE PRIOR ART

The Atencio U.S. Pat. No. 4,056,892 discloses an engineering table in the form of a box which contains a medium which can be shaped into scaled landscape designs and features. The box is designed to hold water which can represent lakes, streams, or an ocean.

The Taggart U.S. Pat. No. 5,427,530 discloses a portable water pollution model for simulating water pollution. The model includes a simulated body of water, a simulated water pollution source, a simulated water pollutant, and a fluid dispenser capable of simulating rain over the model.

The Clough U.S. Pat. No. 339,741 discloses a table having a top surface in the form of a tray in which relief maps molded from sand or other materials are formed. The table includes a water source for producing a light shower or fine spray of water which forms lakes, bays, or streams as part of the relief map.

None of these devices, however, simulate or model the transient sediment characteristics of a river or stream. Historically, sediment phenomena have been analyzed using large physical sediment models, also known as movable bed models. The advantage of using physical sediment models is that the overall sediment transport phenomena, including both the three-dimensional mechanics and the resulting sediment distribution, are all inherently addressed in the operational dynamics of the model itself. Scour holes and point bars form easily, and secondary currents have been measured in these models and displayed through flow visualization techniques.

Hundreds of these large models have been constructed and tested throughout the United States and elsewhere in the world with great success. Unfortunately, even though a high level of confidence can be obtained using these physical models, time and cost have always limited more widespread use of them. Physical sediment models can range in length up to 100 yards, in width up to 10 feet, and in depth up to 3 feet. These models can cost in the hundreds of thousands of dollars to build, operate, and conduct experimentation. In addition, due to the large scale of these models, the time required to calibrate and verify the model and evaluate design alternatives may take years.

Another limitation of these large physical sediment models is their inability to efficiently illustrate sediment transport effects visually over the course of a hydrographic event. Since sediment transport effects occur relatively slowly in a large physical sediment model, one would have to stand above the model for several days to observe any significant changes. Therefore, unless a large amount of time, space, and money is available, the use of a typical physical sediment model is impractical.

As an alternative to physical sediment models, crude estimates based on theoretical equations or numerical models are often employed to study sediment transport phenomena. These numerical models typically require more information from the field than physical sediment models including sediment load curves and bed material gradation data.

Numerical models must first solve the hydrodynamic portion of the flow. This is accomplished using a standard step procedure or some other method to define water surface profiles. Velocity distribution is then obtained by variable procedures, such as a two-dimensional depth integrated procedure. The velocity is then linked to an entrainment or sediment transport function from which total scour and deposition are calculated. The computations are performed on a computer, usually employing finite element analysis or some other computational grid analysis procedure. The results may be displayed in the form of computer printouts of sediment quantities or a graphical plan view contour map showing the resultant bed configuration.

Numerical mathematical models have many drawbacks. Their operation is complex and requires extensive training and experience. In addition, the models do not adequately address secondary current effects in bends and, therefore, do not accurately define the sediment transport in bends. Conducting studies using numerical models also requires considerable time and money. A comparative study requiring three years to complete with a physical sediment model would take approximately one year with a numerical model and would cost in excess of a hundred thousand dollars. Lastly, the output of numerical models only defines a certain bed configuration. To accurately display the changes in the bed response of the river or stream through the course of the hydrograph would require an enormous amount of additional time and cost, and the user would merely have a snapshot display of each bed configuration. These configurations could be animated, but the technology to accomplish this has either not been used or has not been developed.

The present invention was developed to overcome these and other drawbacks of the prior methods and apparatus by providing a portable apparatus for accurately and cost effectively modeling the sediment transport phenomena of a selected section of a river or stream.

SUMMARY OF THE INVENTION

Accordingly, it is a primary object of the present invention to provide a method and apparatus for accurately modeling the sediment transport characteristics of a section of a river or the like. More particularly, the apparatus includes a flume containing a removable scaled model insert which represents the section of river to be evaluated, a simulated sediment material, and a water source for providing water to the model, whereby as the water flows over the model, the sediment is transported and deposited so as to simulate the sediment phenomena of the portion of the actual prototype river being studied.

It is another object of the present invention to provide an apparatus for modeling sediment transport characteristics which is portable, affordable, and easy to construct and operate.

It is a further object of the present invention to provide an apparatus which allows the transient sediment phenomena to be observed continuously as they occur.

It is yet another object of the present invention to provide an apparatus which allows sediment transport studies to be conducted in a relatively short amount of time compared with large physical sediment type models.

According to a further object of the present invention, an apparatus is provided which allows accurate cross sectional survey profiles of the model bed configuration to be obtained at selected increments along the model.

It is another object of the invention to provide a sediment modeling apparatus which allows the water to be delivered to the model according to a given hydrograph.

It is yet another object of the invention to provide a portable sediment modeling apparatus which serves as a qualitative and quantitative sediment transport tool which allows for visual observation of the sediment transport phenomena in, for example, a classroom for educational instruction or in a courtroom for use in litigation.

BRIEF DESCRIPTION OF THE DRAWINGS

Other objects and advantages of the invention will become apparent from a study of the following specification when viewed in light of the accompanying drawings, in which:

FIG. 1 is a top view of a movable bed sediment transport model;

FIG. 2 is a cross sectional view of the movable bed model of FIG. 1;

FIG. 3 is a perspective view of the sediment modeling apparatus according to the invention; and FIG. 4 is a side sectional view of the apparatus illustrating the piping for recirculating the water.

DETAILED DESCRIPTION

Referring first to FIG. 1, there is shown a typical movable bed sediment transport model. The model comprises a test section 2 having a forebay 4 into which water discharged from the pump 6 enters the model. The water flows past baffles 8 and enters a fixed entrance transition section 10 which develop the proper entrance flow conditions. The water then flows though the model which includes a movable bed 12 and a fixed overbank 14 and exits into a fixed exit transition section 16. Runoff sediment is collected in the sediment trap 18 located in the tail bay 20 and the water is recirculated via return line 22. The return line discharges the water into a sump 24 which collects and contains the water until it is again pumped to the model. Due to the size, movable bed models are constructed in place and are permanent structures.

FIG. 2 shows a cross section of the movable bed model. The model includes a flume 26, a female template 28 arranged within the flume, a filler material 30, such as a mixture of sand and clay, placed within the female template, and a channel 32 which simulates the alignment of the river being modeled. The channel is filled with a model bed material 34, such as crushed coal.

The bed topography is formed by placing male templates 36 at selected increments along the channel bed to mold the bed material to the appropriate configuration. These templates are formed based on cross sectional survey data from the river being modeled. The templates thus form a skeletal outline of the bed topography. Between each template, surveyors eyeball or interpolate the bed, forming bed contours by hand. The end result is a model bed configuration representing the starting condition of the model study.

After each hydrograph is run, the model is returned to its starting condition. This means that the model bed must be remolded using the template procedure described above. This procedure is extremely time consuming, costly, and labor intensive.

Referring now to FIG. 3, there is shown a micro model flume apparatus including a flume 38 mounted on a pair of support legs 40. The flume is generally designed to the size of a standard commercial tabletop but may vary in size to accommodate the scale selected for the sediment study. The goal is to construct the apparatus small enough and light enough to be transportable to meetings and demonstrations. For example, a typical flume would have a length of approximately five feet, a width of two feet and a depth of five inches. Larger more permanent apparatus, however, can be constructed if necessary.

The flume includes two longitudinally extending side walls 42, a bottom wall 44, and two end walls 46 which define a box-like structure with an interior adapted to receive and hold the model insert 48. The interior area of the flume is provided with a forward baffle 50 which defines a sediment storage bay section 52 which is used to store model bed material (i.e. simulated sediment) and to introduce the sediment into the model.

The simulated sediment material is called "plasti-grit", a synthetic plastic used primarily as a sand blasting agent. The material has a specific gravity of 1.23 and is available in particle size gradations ranging from 0.1 inches to 0.02 inches for use in the model. This material is light enough to move in the micro model under extremely small flow velocity conditions, yet is dense enough that it will not remain in suspension. As a result, the water remains clear so that the sediment movement can be observed by the individual conducting the investigation. Other materials such as walnut shell, Gilsonite™, crushed coal, and sand may also be used.

A splash guard 54 is attached to the forward baffle to prevent unregulated water and model bed material from reaching the model.

The interior area of the flume is also provided with a downstream baffle 56 which defines a tail bay section 58 which contains a removable sediment catch basin 60. The tail bay section and catch basin collect sediment and water run-off at the end of the model and can also be used to control the slope of the model.

Level gages 62, which may be of the electronic or conventional bubble type, are provided to allow the floodplain tilt or slope of the flume to be accurately measured and adjusted. The flume is constructed from plywood which is provided with a waterproof coating of fiberglass.

Referring now to FIG. 4, a drain pipe 64 is attached to the tail bay section 58 to allow run-off water collected in the tail bay section to drain into the drainage reservoir 66 located beneath the flume. A submersible pump 68 is located in the drainage reservoir for pumping the water back to the sediment storage bay 52 via conduit 70 which extends horizontally below the flume 38 from the pump outlet through openings 72 provided in the support legs, vertically upwardwardly along the forward end wall 46, and into the sediment storage bay. Of course, other pumps and pumping arrangements may be used to accomplish this task.

Conduit 70 is provided with a flowmeter 74 to allow for accurate measurement of the flow rate delivered to the model and is also provided with a valve 76, such as a ball valve, to allow the peak or maximum flow rate delivered to the model to be controlled.

Referring once again to FIG. 3, the pump is controlled by a commercially available electronic function generator 78 which delivers flow in accordance with a user specified hydrograph. In this manner, the user specifies a time duration and the generator supplies a sinusoidal response to the pump similar to a hydrographic response experienced in the prototype being modeled.

Four slope adjustment screws or jacks 80 are provided under the support legs 40 to allow both the lateral (i.e. side to side) slope and the longitudinal slope (i.e. floodplain tilt) to be controlled. Alternatively, the slope adjustment mechanism could be placed on the bottom surface 44 of the flume under the model insert 48.

The micro model insert 48 contains the existing alignment of the section of river or stream under study as represented by flow channel 82. This includes all geographical and man made features including islands, side channels, dikes, revetments, lock and dams, bendway weirs, harbor facilities and any other feature contained within the top of the bank or ordinary high water elevation. Any feature contained in the natural sediment transport path of the river/stream channel is modeled.

The model insert is constructed by first obtaining detailed maps or aerial photographs defining the alignment of the river or stream to be studied. Next, horizontal and vertical scales are chosen. The horizontal scale may vary from as large as 1 inch=1 foot to as small as 1 inch=2000 feet and the vertical scale may vary from 1 inch=1 foot to 1 inch=200 feet. The scale depends on the size of the study, the length of the river, the amount of boundary width deviation and other factors. The objective is to choose a micro scale that will fit within a table top sized flume.

The photograph or map is then reproduced to the size of the determined scale. The modeler determines how much additional reach upstream and downstream is required to develop sufficient entrance and exit conditions. The boundary features are then transposed to the surface of a base material which is prepared for cutting. The base material can be polyurethane, styrofoam, fiberglass coated wood, acrylic, or any other water durable material. The exact alignment or aerial configuration of the shoreline is then cut to the selected scale. The final product is a hollowed out flume insert which is placed in the flume as shown in FIG. 3.

MICRO MODELING TEST PROCEDURE

The micro modeling procedure includes preparing a model insert as described above and placing it in the flume, placing simulated sediment material in the flow channel of the insert to approximately 50 percent capacity, applying a preliminary slope or floodplain tilt to the model, determining a vertical scale, establishing an elevation mark in the flow channel to symbolize the "top of bank" profile, running water through the model at the "top of bank" elevation for ten minutes or until adequate bed configuration formation has occurred, and surveying the bed configuration at specified increments located throughout the chosen region of study.

To facilitate taking surveys of the model bed configuration, a commercially available electronic digital micrometer 84 linked to a personal computer (not shown) is slidably mounted on a sliding ruler 86 positioned over the micro model insert. The user positions the micrometer probe tip 88 down to the desired reference elevation and zeroes the gage reading. Readings to this zero reference are then input to the computer as the micrometer slides across the channel. This is repeated along the channel at specified increments until a complete survey of the bed configuration is obtained. Plots from these surveys are then compared to cross sections taken from prototype surveys and necessary adjustments are made to the model slope, sediment input, discharge peak, and time scale. The model is then run using a hydrographic response. This is repeated until a satisfactory response is achieved.

As the bed configuration develops and nears similarity to the prototype river being modeled, base test conditions are ready to be developed. This is accomplished by running a hydrograph, which is controlled by the function generator, and surveying the model with the micrometer. This procedure is repeated a number of times and the test results are averaged to produce an "average expected sediment response" which represents the base test.

Alternate designs may then be tested. For example, a modeler may install a particular plan to study the effects on channel development. Each design test is repeated a number of times and averaged into a single expected response. This is then compared to the base survey for changes. Using this procedure, the modeler can qualitatively and quantitatively address the impacts of various structures that would be placed in the prototype.

The results may be displayed as contours, three-dimensional grid models, cross sections, or flow visualization in the form of photography and video tapes.

When the micro modeling apparatus is constructed and used in the manner described above, it is portable and provides a cost effective and time responsive methodology for analyzing sedimentation in rivers and streams. The micro model can be operated by one person and eliminates the need for large amounts of costly real estate, construction of concrete flumes, and large pumps and reservoirs.

Moreover, micro model studies can be conducted in a few weeks rather than years. The micro scale requires a hydrographic response of approximately two to five minutes for each prototype year. This means that a multitude of hydrographs can be quickly simulated with the micro model in a few hours. In the large physical sediment type models, similar tests normally take between twelve and forty hours to run.

In addition, micro modeling accurately simulates the three-dimensional flow effects found in the prototype, including secondary currents in bends, and allows the complex processes and dynamics of water and sediment flow to be easily observed.

Micro modeling also serves as a qualitative and quantitative sediment evaluation tool for use in litigation which can be set up in the courtroom. Since the model is visual, jurors can observe and understand processes that might not otherwise be easily explained. Similarly, the micro model serves as a demonstrative educational tool for use in the classroom.

While in accordance with the provisions of the patent statute the preferred forms and embodiments have been illustrated and described, it will be apparent to those of ordinary skill in the art that various changes and modifications may be made without deviating from the inventive concept set forth above.

What is claimed is:

1. Apparatus for modeling the sediment transport characteristics of a section of a river or the like, comprising:

(a) an elevated platform, said platform having an inclined end and a lower end;

(b) an insert arranged on said platform, said insert having a top surface representing a scaled model of a section of the river to be evaluated;

(c) means for delivering water to said inclined end of said insert top surface;

(d) sediment material arranged on said insert top surface and entrained in the water, whereby as the water flows over said insert top surface from said inclined end to said lower end, said sediment material is transported and deposited on said insert top surface, thereby simulating the sedimentary characteristics of the modeled portion of the river;

wherein said water delivery means comprises means for recirculating the water, said recirculating means including:

(e) a drainage reservoir for collecting water draining from said platform lower end;

(f) a conduit connecting said drainage reservoir with said platform inclined end; and (g) further comprising a function generator connected with said pump means for controlling said pump means, wherein the water is delivered to said model in accordance with a specified hydrograph.

2. Apparatus as defined in claim 1, and further comprising means for varying the degree of inclination of said platform.

3. Apparatus as defined in claim 2, wherein said inclination varying means includes at least one jack arranged under said platform.

4. Apparatus as defined in claim 1, wherein said platform inclined end includes a sediment storage bay for retaining said sediment material and introducing said sediment material into the water.

5. Apparatus as defined in claim 1, and further comprising means for measuring the flow rate of the water delivered to said inclined end of said insert.

6. Apparatus as defined in claim 1, wherein said platform lower end includes a sediment catch basin for collecting run-off sediment material.

7. Apparatus as defined in claim 1, wherein said sediment material is a synthetic plastic material having a specific gravity of approximately 1.23.

8. Apparatus as defined in claim 1, and further comprising sensor means slidably mounted on said platform for obtaining survey data at specified increments along said model.

9. Method for modeling the sediment transport characteristics of a section of a river or the like, comprising the steps of:

(a) preparing a model of a selected portion of the river to be studied, said model containing a channel;

(b) filling said channel with a simulated sediment material to approximately 50% capacity;

(c) applying a given set of operating parameters to said model, whereby a bed configuration develops;

(d) comparing said model bed configuration with the bed configuration of the river being modeled;

(e) adjusting said operating parameters as needed to create an accurate model;

(f) developing base conditions; and (g) conducting tests, whereby the impact of various structures placed in said bed configuration is evaluated.

10. Method as defined in claim 9, wherein said operating parameters include peak flow discharge, flow discharge duration, floodplain tilt, and simulated sediment input rate.

11. Method as defined in claim 9, wherein said developing base conditions step includes:

(h) running a hydrograph;

(i) surveying said model bed configuration; and (j) repeating steps (h) and (i) to obtain an average base survey.

* * * * *